(12) United States Patent
Addepalli (10) Patent No.: US 11,423,454 B2
(45) Date of Patent: Aug. 23, 2022

(54) REAL-TIME CUSTOMIZABLE AI MODEL COLLABORATION AND MARKETPLACE SERVICE OVER A TRUSTED AI MODEL NETWORK

(71) Applicant: Sateesh Kumar Addepalli, San Jose, CA (US)

(72) Inventor: Sateesh Kumar Addepalli, San Jose, CA (US)

( * ) Notice: Subject to any disclaimer, the term of this patent is extended or adjusted under 35 U.S.C. 154(b) by 331 days.

(21) Appl. No.: 16/789,357

(22) Filed: Feb. 12, 2020

(65) Prior Publication Data

US 2020/0265493 A1    Aug. 20, 2020

Related U.S. Application Data

(60) Provisional application No. 62/806,544, filed on Feb. 15, 2019.

(51) Int. Cl.
*G06Q 30/06* (2012.01)
*G06F 21/10* (2013.01)
(Continued)

(52) U.S. Cl.
CPC ......... *G06Q 30/0619* (2013.01); *G06F 21/10* (2013.01); *G06N 5/04* (2013.01);
(Continued)

(58) Field of Classification Search
None
See application file for complete search history.

(56) References Cited

U.S. PATENT DOCUMENTS

| 5,487,153 A | 1/1996 | Hammerstrom et al. |
| 8,270,691 B2 * | 9/2012 | Xu .................... G06T 7/38 |
| | | 382/128 |

(Continued)

FOREIGN PATENT DOCUMENTS

| CN | 102893233 B | 1/2016 |
| WO | 2011050482 A1 | 5/2011 |

(Continued)

OTHER PUBLICATIONS

Weyns, D., "Tutorial: Engineering Self-Adaptive Software Systems—An Organized Tour," 2018 IEEE 3rd International Workshop on Foundations and Applications of Self* Systems (FAS*W), pp. 1-2, published Sep. 1, 2018. (Year: 2018).*

(Continued)

*Primary Examiner* — Nicholas D Rosen
(74) *Attorney, Agent, or Firm* — Steven A. Nielsen; www.NielsenPatents.com (57) ABSTRACT

Aspects of the present disclosure provide for a novel system and method where users can promote, subscribe, license, train collaboratively, and/or trade AI models in real-time over an AI trusted model network that represents a group of trusted users across platform agnostic ways. The system and methods described herein may effectively provide a marketplace to collaboratively develop and reliably disseminate developed AI models to other users who may have similar needs. The system may include an AI user device server (AI-UDS), an AI trusted model network (AI-TMN), an AI secure marketplace system (AI-SMPS), an AI collaborative training platform (AI-CTP), an AI secure transaction fulfillment system (AI-STFS), and an AI model license subscription management platform (AI-LSMP).

10 Claims, 7 Drawing Sheets

(51) Int. Cl.
*G06N 5/04* (2006.01)
*G06N 20/00* (2019.01)
*G06Q 20/12* (2012.01)
*G06Q 20/38* (2012.01)
*G06Q 30/08* (2012.01)

(52) U.S. Cl.
CPC ........... *G06N 20/00* (2019.01); *G06Q 20/123* (2013.01); *G06Q 20/382* (2013.01); *G06Q 30/08* (2013.01); *G06Q 30/0645* (2013.01)

(56) References Cited

U.S. PATENT DOCUMENTS

| | | | |
|---|---|---|---|
| 8,521,664 | B1 | 8/2013 | Lin et al. |
| 9,285,783 | B2 | 3/2016 | Craig et al. |
| 10,177,998 | B2 * | 1/2019 | Parandehgheibi .. H04L 43/0882 |
| 10,586,173 | B2 * | 3/2020 | Hammond ........... G06K 9/6257 |
| 10,839,069 | B2 * | 11/2020 | Shen ........................ G06F 21/51 |
| 10,878,388 | B2 * | 12/2020 | Wang ................... G06Q 20/065 |
| 11,132,605 | B2 * | 9/2021 | Dasgupta ............... G06V 10/82 |
| 11,150,655 | B2 * | 10/2021 | Zhou ...................... G05D 1/0088 |
| 11,244,222 | B2 * | 2/2022 | Kuo ........................ G06N 20/00 |
| 2008/0137550 | A1 | 6/2008 | Jurca et al. |
| 2008/0235162 | A1 | 9/2008 | Spring |
| 2009/0077649 | A1 * | 3/2009 | Lockhart ............... H04L 63/105 726/14 |
| 2009/0092298 | A1 * | 4/2009 | Xu ........................... G06T 7/33 382/128 |
| 2010/0185566 | A1 | 7/2010 | Schott et al. |
| 2010/0285082 | A1 | 11/2010 | Fernandez |
| 2012/0101652 | A1 | 4/2012 | Shin et al. |
| 2012/0150361 | A1 | 6/2012 | Lazaris |
| 2012/0311488 | A1 | 12/2012 | Mouton et al. |
| 2013/0111487 | A1 | 5/2013 | Cheyer et al. |
| 2013/0262349 | A1 * | 10/2013 | Bouqata ................. G06N 20/10 706/12 |
| 2015/0235308 | A1 | 8/2015 | Mick et al. |
| 2016/0239074 | A1 | 8/2016 | Lee et al. |
| 2016/0359740 | A1 * | 12/2016 | Parandehgheibi .... H04W 84/18 |
| 2017/0005515 | A1 | 1/2017 | Sanders et al. |
| 2017/0103314 | A1 | 4/2017 | Ross |
| 2017/0123419 | A1 | 5/2017 | Levinson et al. |
| 2017/0213128 | A1 | 7/2017 | Hammond et al. |
| 2017/0213131 | A1 | 7/2017 | Hammond et al. |
| 2017/0213155 | A1 * | 7/2017 | Hammond ........... G06K 9/6257 |
| 2017/0220947 | A1 * | 8/2017 | Tariq ................... G06Q 30/0202 |
| 2017/0308800 | A1 | 10/2017 | Cichon et al. |
| 2017/0318008 | A1 | 11/2017 | Mead |
| 2017/0323197 | A1 | 11/2017 | Gibson et al. |
| 2018/0129952 | A1 | 5/2018 | Saxena et al. |
| 2018/0293463 | A1 | 10/2018 | Brown |
| 2018/0322390 | A1 | 11/2018 | Das et al. |
| 2019/0004518 | A1 * | 1/2019 | Zhou .................... G05D 1/0088 |
| 2019/0019317 | A1 * | 1/2019 | Zhang ................... G16H 30/20 |
| 2019/0156192 | A1 * | 5/2019 | Dasgupta ................. G06N 3/08 |
| 2020/0005116 | A1 * | 1/2020 | Kuo ..................... H04L 67/2842 |
| 2020/0019697 | A1 * | 1/2020 | Shen ................... G06F 21/6209 |
| 2020/0019938 | A1 * | 1/2020 | Wang ..................... G06N 3/084 |
| 2020/0265509 | A1 * | 8/2020 | Kumar Addepalli ........................ H04L 67/1095 |

FOREIGN PATENT DOCUMENTS

| | | |
|---|---|---|
| WO | 2017132590 A1 | 8/2017 |
| WO | 2018184208 A1 | 10/2018 |
| WO | 2018218259 A1 | 11/2018 |
| WO | 2019010065 A1 | 1/2019 |
| WO | 2020163303 A1 | 8/2020 |
| WO | 2020163308 A1 | 8/2020 |
| WO | 2020163315 A1 | 8/2020 |
| WO | 2020163320 A1 | 8/2020 |
| WO | 2020163327 A1 | 8/2020 |
| WO | 2020163333 A1 | 8/2020 |
| WO | 2020168100 A1 | 8/2020 |
| WO | 2020172045 A1 | 8/2020 |
| WO | WO-2020163308 A1 * | 8/2020 ......... G06F 9/30101 |

OTHER PUBLICATIONS

International Search Report and Written Opinion for International PCT Application No. PCT/US2020/016565, dated Apr. 23, 2020. (Year: 2020).*

Wagh et al., Efficient and Private Neural Network Training [online] May 14, 2018 [retrieved May 29, 2020] from https://eprint.iacr.org/2018/442/20180514:150605; Abstract.

International Search Report and Written Opinion for International PCT Application No. PCT/US2020/016560, dated Apr. 30, 2020.

International Search Report and Written Opinion for International PCT Application No. PCT/US2020/018142, dated May 28, 2020.

International Search Report and Written Opinion for International PCT Application No. PCT/US2020/018150, dated May 21, 2020.

\* cited by examiner

FIG. 7

REAL-TIME CUSTOMIZABLE AI MODEL COLLABORATION AND MARKETPLACE SERVICE OVER A TRUSTED AI MODEL NETWORK

CROSS REFERENCE TO RELATED APPLICATIONS

This application claims priority to U.S. Provisional Application No. 62/806,544, filed Feb. 15, 2019, and titled "REAL-TIME CUSTOMIZABLE AI MODEL COLLABORATION AND MARKETPLACE SERVICE OVER A TRUSTED AI MODEL NETWORK," the disclosure of which is hereby incorporated herein by reference in its entirety and for all purposes.

TECHNICAL FIELD

The subject matter disclosed herein generally relates to artificial intelligence. More specifically, the present disclosures relate to systems and methods for a real time, customizable AI model collaboration, trading, and/or licensing and subscription service, facilitating a marketplace over a trusted AI model network.

BACKGROUND

Currently, AI models have been trained and then deployed in wide range of edge applications, such as in autonomous and smart connected vehicles, transportation, health and wellness, industrial Internet of Things (IoT), smart cities/ spaces, and many more public and private environments. This trend of AI deployment is going to grow exponentially. It is desirable to develop infrastructure to securely facilitate these areas of growth.

BRIEF DESCRIPTION OF THE DRAWINGS

Some embodiments are illustrated by way of example and not limitation in the figures of the accompanying drawings.

DETAILED DESCRIPTION

Applicant of the present application owns the following U.S. Provisional Patent Applications, each filed on Feb. 4, 2019, the disclosures of each of which are herein incorporated by reference in their entireties:

U.S. Provisional Patent Application 62/801,044, titled SYSTEMS AND METHODS OF SECURITY FOR TRUSTED AI HARDWARE PROCESSING;

U.S. Provisional Patent Application 62/801,046, titled SYSTEMS AND METHODS FOR ARTIFICIAL INTELLIGENCE HARDWARE PROCESSING;

U.S. Provisional Patent Application 62/801,048, titled SYSTEMS AND METHODS FOR ARTIFICIAL INTELLIGENCE WITH FLEXIBLE HARDWARE PROCESSING FRAMEWORK;

U.S. Provisional Patent Application 62/801,049, titled SYSTEMS AND METHODS FOR CONTINUOUS AND REAL-TIME AI ADAPTIVE SENSE LEARNING;

U.S. Provisional Patent Application 62/801,050, titled LIGHTWEIGHT, HIGH SPEED AND ENERGY EFFICIENT ASYNCHRONOUS AND FILE SYSTEM-BASED ARTIFICIAL INTELLIGENCE PROCESSING INTERFACE FRAMEWORK; and U.S. Provisional Patent Application 62/801,051, titled SYSTEMS AND METHODS FOR POWER MANAGEMENT OF HARDWARE UTILIZING VIRTUAL MULTILANE ARCHITECTURE.

Applicant of the present application also owns U.S. Provisional Patent Application 62/807,677, titled SECURE AND TRUSTED MULTI-TENANT SERVICE DELIVERY PLATFORM FOR DISTRIBUTED MULTITENANT-CAPABLE AI SOLUTION MODEL COMPUTE PROCESSORS, filed on Feb. 19, 2019, the disclosure of which is herein incorporated by reference in its entirety.

Applicant of the present application owns the following U.S. Non-provisional Patent Applications, each filed on Jul. 31, 2019, the disclosures of each of which are herein incorporated by reference in their entireties:

U.S. Non-Provisional patent application Ser. No. 16/528,545, titled SYSTEMS AND METHODS OF SECURITY FOR TRUSTED AI HARDWARE PROCESSING;

U.S. Non-Provisional patent application Ser. No. 16/528,543, titled SYSTEMS AND METHODS FOR ARTIFICIAL INTELLIGENCE HARDWARE PROCESSING;

U.S. Non-Provisional patent application Ser. No. 16/528,548, titled SYSTEMS AND METHODS FOR ARTIFICIAL INTELLIGENCE WITH FLEXIBLE HARDWARE PROCESSING FRAMEWORK;

U.S. Non-Provisional patent application Ser. No. 16/528,549, titled SYSTEMS AND METHODS FOR CONTINUOUS AND REAL-TIME AI ADAPTIVE SENSE LEARNING;

U.S. Non-Provisional patent application Ser. No. 16/528,551, titled LIGHTWEIGHT, HIGH SPEED AND ENERGY EFFICIENT ASYNCHRONOUS AND FILE SYSTEM-BASED ARTIFICIAL INTELLIGENCE PROCESSING INTERFACE FRAMEWORK; and U.S. Non-Provisional patent application Ser. No. 16/528,553, titled SYSTEMS AND METHODS FOR POWER MANAGEMENT OF HARDWARE UTILIZING VIRTUAL MULTILANE ARCHITECTURE.

Today, in general, AI models have been trained and then deployed in wide range of edge applications namely, autonomous and smart connected vehicles, transportation, health and wellness, industrial Internet of Things (IoT), smart cities/spaces, and many more public and private environments. This trend of AI deployment is going to grow exponentially.

However, AI model creation is a tedious process that requires extensive learning and training, with a continuous stream of specific set of sense data that can be applied to customized/personalized AI applications/solutions that satisfy a given use case need.

Future applications of AI are going to be prevalent and important. Reaching this stage may demand the creation of millions or even billions of AI models to be trained in real-time for these and other similar use cases. The approach of learning and training these many AI models by perhaps billions of users/entities for billions of simultaneous and similar use cases will not be practical with current infrastructures, due to the sheer volume of sense data, privacy concerns about each user's data, communication bottlenecks, processing power, energy and cost.

Moreover, if there is already the hard work of learning & training done by one user/entity for a given specific AI solution/application use case or problem, then another user may be able to benefit or leverage the existing work by, for example, being able to rent, subscribe, buy or barter from the first user, rather than going through the same hard work, resource utilization, sharing of private data, and cost of doing any of these functions. Some sort of pay as you need scheme for model usage may be warranted as a result.

For example, suppose a user is travelling to a new place short-term and wants to download one or more AI models into a rental vehicle that utilizes safe autonomous driving and/or for AI driven in-vehicle adaptive comfort, etc. The user may want to look for an AI model from a marketplace or from some selection that satisfies the user's needs/requirements, and rent/subscribe for a given period of time. The needs or specifications of the user may be particular and customizable.

As another example, suppose a given vehicle brand user/entity spends extensive time in learning and training an AI model using one particular vehicle. The vehicle brand user/entity can decide to provide the learned and trained AI model to other users/entities by selling, licensing, or providing a pay as you need subscription.

As yet another example, suppose a user/entity who is a doctor or patient creates an AI model through extensive sensing, learning and training to diagnose, treat or operate a given disease or health symptom. The user may decide to sell or provide a subscription of the AI model to another user that may utilize the same findings of the model.

In general, it is anticipated that there will be use cases where personalized or customized AI models are trained by one user and may be of use to another user for a similar or related reason. Even if the needs may be very particular or specific to a second user, the earlier built AI model by a first user may be used as a starting point to avoid recreating the same core aspects of the AI model. Therefore, the second user may be able to utilize previously trained AI models that can still be customized or personalized for their use, and the first user may wish to market their developed models to a secondary market of users.

In this way, AI models can become a premium commodity asset. They may even be developed as a collaboratively trainable product with a marketplace of people or other users interested in working together to build personalized AI models. In time, demand may develop for users to buy, sell, trade or collaboratively train their personalized/customized AI models among themselves on a peer-to-peer basis.

Currently, there is neither trusted and secure infrastructure, nor a real-time marketplace for commoditizing (e.g., buying, selling, bartering, promoting or providing subscriptions in a regular, free or freemium manner), providing a subscription service, or providing a licensing service for personalized/customized AI models on a peer-to-peer basis among individuals/entities.

Aspects of the present disclosure provide for a novel system and method where users can promote, subscribe, license, train collaboratively, and/or trade AI models in real-time over an AI trusted model network that represents a group of trusted users across platform agnostic ways. The system and methods described herein may effectively provide a marketplace to collaboratively develop and reliably disseminate developed AI models to other users who may have similar needs.

In addition, devices running an AI system like those described in (Non-Provisional applications 1, 2, 3, 4, 5, and/or 6, which are again incorporated herein by reference) will be able to run subscribed AI models on a compute agnostic and/or multi-tenancy environment in a trusted, secure and confidentiality manner. This prevents any infringement and/or release to torrents of AI models.

Figure 1:
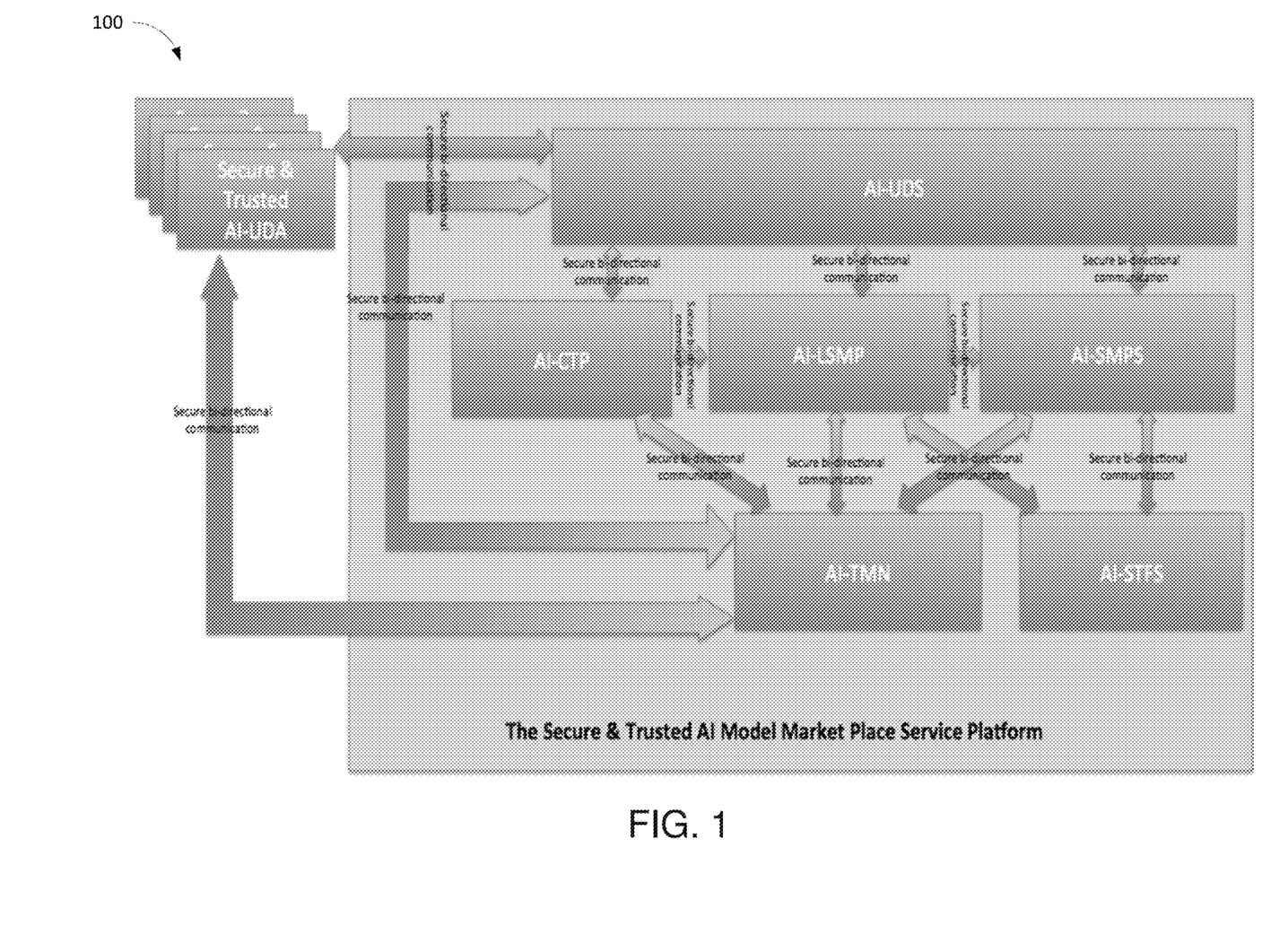
FIG. 1 shows a block diagram for a service platform that provides a secure and trusted AI model marketplace and its interactions with multiple user devices that can perform AI modeling, referred to herein as AI user device agents (AI-UDAs), according to some embodiments.

The Secure & Trusted AI Model Marketplace Service Platform and AI User Device Agent Referring to FIG. 1, shown is a block diagram 100 for a service platform that provides a secure and trusted AI model marketplace and its interactions with multiple user devices that can perform AI modeling, referred to herein as AI user device agents (AI-UDAs), according to some embodiments. In some embodiments, the marketplace is scalable, distributed, and provides secure and trusted connection to the AI-UDAs. The AI-UDAs may also provide secure and trusted connection to the AI model marketplace platform. The AI-UDAs may be various kinds of devices, such as robots, automotive vehicles, smart phones, tablets, smart appliances, other IoT devices, health devices, and so forth.

As shown in FIG. 1, there are example functional modules that may be included in the AI model marketplace platform, though other modules may also be included. In general, these modules may be highly scalable and distributed in nature.

In one block, there is the AI trusted model network (AI-TMN). Here, models can be pushed and pulled in a secure, trusted and distributed manner. Fully bought or licensed keys or time bound subscription keys that may be limited per user and on a per-AI model basis may be generated and validated by the AI-TMN. In addition, multiple types of licensing options may be made available for AI model vendors to choose from.

Moreover, all of the AI models may be stored in the AI-TMN in a trusted and secured manner and not stored anywhere else. AI models are dynamically pushed and pulled to/from the AI-TMN. Each AI model is encrypted and integrity protected and used by the subscribing/licensing user with a uniquely generated time-bound/fully licensed key.

In a second block, there is the AI Secure Transaction Fulfillment System (AI-STFS) with a peer-to-peer payment system. This may provide traditional bank gateways, virtual currency gateways, promotional gateways, and review and analytics processing.

In a third block, there is the AI Secure Market Place System (AI-SMPS) communicatively coupled to the AI-TMN and AI-STFS. This module may be configured to enable bidding of AI models in real-time for promoting, buying, selling, bartering and/or licensing.

In a fourth block, there is shown the AI model license subscription management Platform (AI-LSMP) communicatively coupled to the AI-TMN, SP-FS and SMPS. This module may be configured to provide a number of different functions, such as:

A. User registration and subscriber management

B. pay as you use subscription management of AI models. This may include various subscription granularities, ranging from providing fully licensed key access to time bound subscription keys customized to user requirements, usage and payment/promotion options.

C. Allow subscription driven AI model management. For example, it may manage uploading, selling, or downloading AI models bought from/to the AI-TMN.

In a fifth block, there is shown the AI Collaborative Training Platform (AI-CTP). In collaboration with the above modules, the AI-CTP enables collaborative training of a given AI model that can be pulled by a group of users, from the AI-TMN and into their respective device agents. The users may then train the AI model in a distributed and collaborative way and merge the training results to create an updated AI model before pushing back the AI model to the AI-TMN.

In a sixth block, there is shown the AI User device Server (AI-UDS). This provides a primary secure interface to all users and their corresponding devices interacting with the service. The AI-UDS may provide a key entry point to all the key elements within the platform. It also may handle all the requests and responses for interpretation, queuing and routing to/from the aforementioned platform elements.

The above modules in FIG. 1 can be implemented in a scalable and distributed fashion. Further details of each of the modules will be described more below.

AI Model Trusted Model Network (AI-TMN)

As previously mentioned, AI models can be pushed and pulled in a secure, trusted and distributed manner via the AI-TMN.

A fully bought license key or time-bound subscription key per user, per AI model basis, may be generated and validated by the AI-TMN when requested by the other modules of the platform.

All the AI models may be stored in the AI-TMN only in a trusted and secured manner and not stored anywhere else. They are pushed and pulled to/from the AI-TMN. Each model is encrypted and integrity protected and used by the subscribing/licensing user with a uniquely generated time-bound/fully licensed key.

Figure 2:
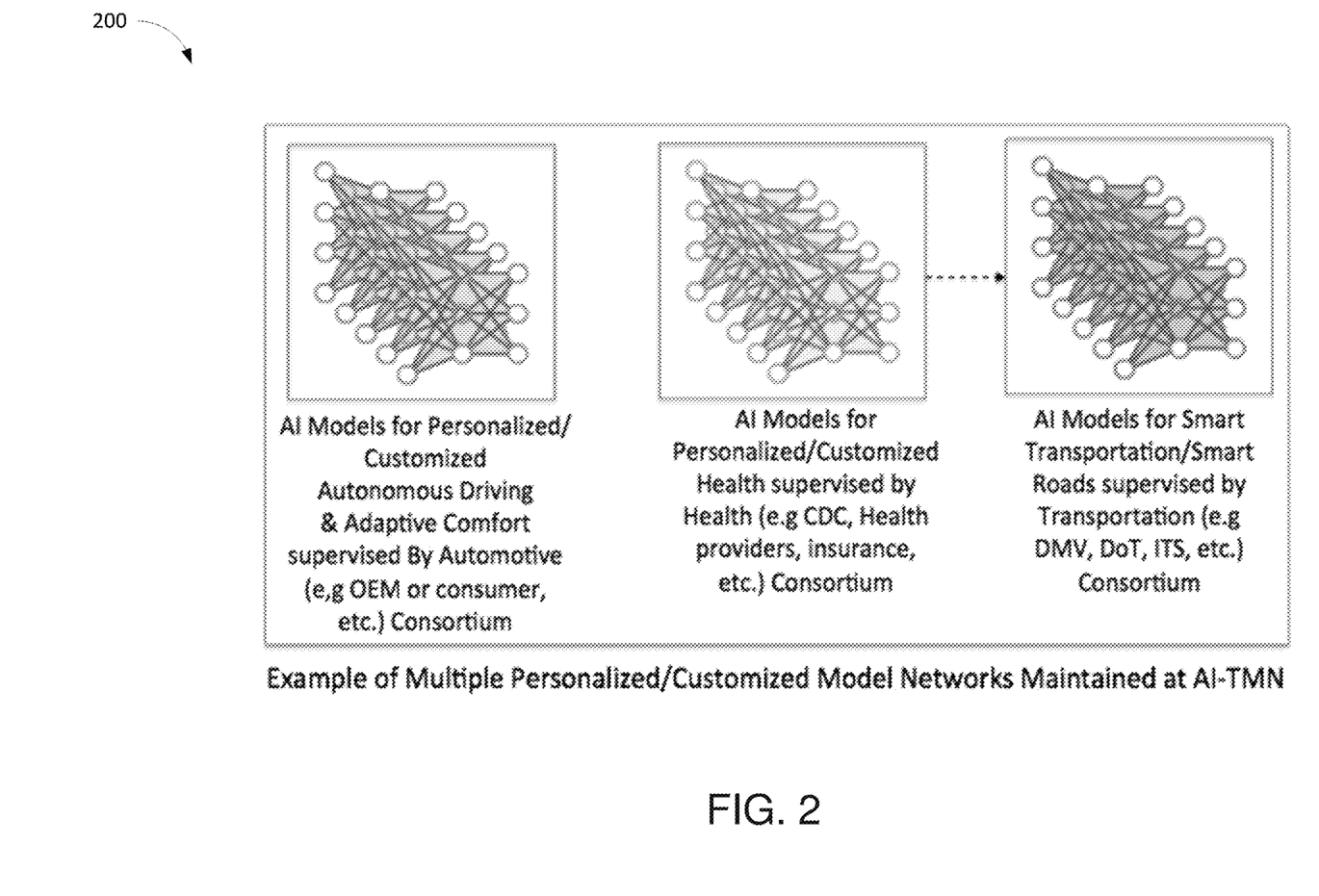
FIG. 2 is a graphical illustration of multiple AI trusted model networks (AI-TMNs) that may be contextualized to different fields that may utilize AI models.

The platform may provide multiple AI-TMNs to different sets of users. FIG. 2 is a graphical illustration 200 of multiple AI-TMNs that may be contextualized to different fields that may utilize AI models. In each AI-TMN, members can push or pull the AI models dynamically to/from the network in a secure and trusted fashion. For example, if a given trusted AI model network belongs to a health care system, then members belonging to that community can push models to the network. Access policies may be applied to ensure only permitted members can push or pull one or more AI models to/from the network. Granularity of the access can vary, for example, full public access, or restricted private access to push or pull an AI model. AI model networks can be maintained by private entities or public entities. For example, automotive OEMs may maintain a private AI model network of autonomous vehicle AI models. As another example, the CDC may maintain a public AI model network for pandemic diseases, or a health provider consortium may supervise targeted personalized/customized AI health models to detect/cure a disease. Similarly, the DMV may maintain a public AI model network for automotive and smart transportation use case scenarios (e.g., smart roadside assistance, detecting road conditions, adaptive traffic management, pedestrian detection, etc.).

In some embodiments, each AI model network may be configured to:

a. Ascertain the identity of a member belonging to the trusted AI network model membership through credentials;

b. Verify that the AI model belongs to the trusted AI model network;

c. Allow storage and retrieval of AI models to/from the AI model network in a distributed fashion;

d. Provide provision to monitor and detect bad members for accountability by establishing and operating a trusted arbitration authority; and e. Provide various credential acquisitions from the trusted network, including time bound subscription keys and enforcement while running a model for a given user member.

Figure 3:
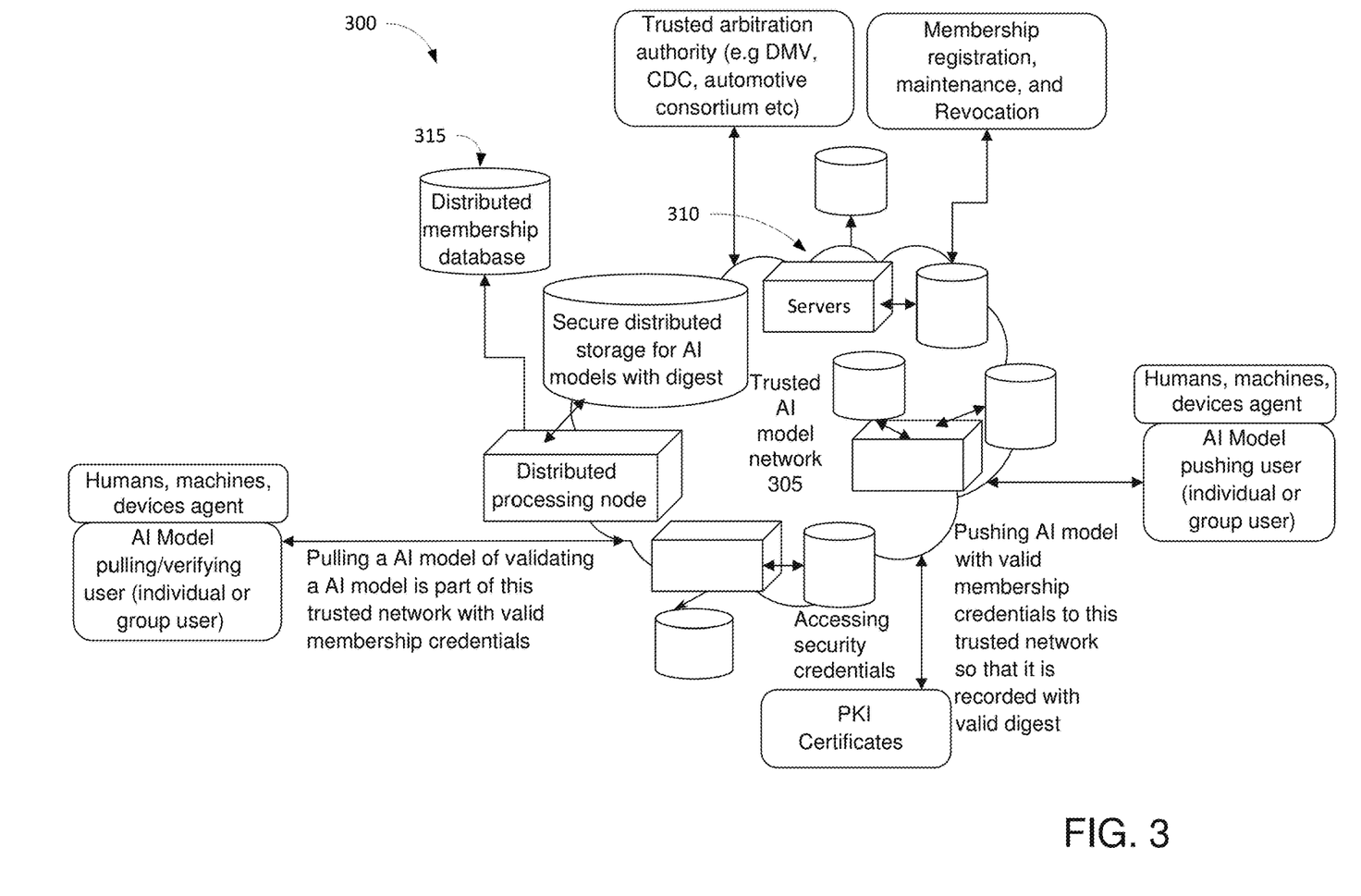
FIG. 3 is a high level block diagram showing the overall trusted AI model network architecture, according to some embodiments.

FIG. 3 is a high level block diagram 300 showing the overall trusted AI model network architecture, according to some embodiments. Various entities may be involved, such as distributed AI model services servers 310, secure distributed databases 315 of encrypted models with digest entries, roles of each entities, and various stake holders. Shown also are: blocks from/to an entity and trusted model network 305; members registration (individual or group user); members verification and authentication; model entry by authorized member; model association with authorized user; model Encryption; and model validation & verification to ensure it is part of the network.

In some embodiments, AI models are linked together to create an AI model train/chain to prevent any of the models from tampering or alteration. Block chain technology can be used to achieve this goal. Tampering is the modification of a vendor's model by any of the platform hosting party or any other malicious party/end-user who has downloaded it for use. An end-user can only modify the model only under a specific license type if the vendor has enabled it.

In some embodiments, there can be multiple AI model groups of AI model trains/chains to represent different AI model types, user/user groups and organizations holding it.

In some embodiments, dynamic secure key creation and management may include providing a full licensing key or time-bound subscription key.

In some embodiments, models can be dynamically pushed and pulled from an AI-UDS or an AI-UDA in a secure, trusted and distributed manner.

In some embodiments, a full licensing key or a time-bound subscription key on a per user, per AI model basis can be created, per request from the AI-UDS. A license key or subscription key can be uniquely tied to a single user or group of users, or tied to a particular device or devices of the user or group of users, on a transferrable or non-transferrable basis.

Each AI model, while pulled for use, may be associated, signed and encrypted, with a specific licensing/time bound licensing key, as well as other required keys, in order to prevent any tampering of it or unauthorized usage of it. This includes ensuring its use only for a specified period of time.

An associated time bound subscription key or license key for a given AI model may be coded with "use only" rights of the AI model (for example, inference only), "modify only" rights of the AI model (for example, training only), or "use & modify" rights of the AI model (for example, both inference and training). Each of these rights can be further qualified as transferrable or non-transferrable, as well as with push or no-push rights.

In some embodiments, original models fully owned by original owners can be pushed to the AI trusted model network. In addition, users who previously pulled the AI model with "modify" and "push" rights can push a trained AI model back to the AI-TMN.

Types of Licenses

The following are some examples of types of licenses that may be provided by the AI-TMN:

1. License to Use Only: Under this type, an end user can only use it and is not allowed to tamper/change the model.

2. License to Modify: Under this type, an end user can use and modify the model. However, in case the user decides to re-upload to the platform, the order of license holders is preserved. The original model vendor is credited for the original model.

3. Single device license key: This only allows 1 device to use the model. If an end user has multiple devices, either multiple licenses have to be generated or a group license key type can be used (if the vendor enables it).

4. Group license keys: This allows multiple devices, specific machines or device agents to use the same license.

5. Universal device license key: The vendor can enable this type of license, wherein a specific category of device(s) can use the same license to run the model.

6. Non-transferrable license: The license cannot be transferred to another user/device.

7. Transferrable license: The license can be transferred to another user/device.

AI Model Secure Transaction Fulfillment System (AI-STFS)

The AI Secure Transaction Fulfillment System (AI-STFS) may be configured to provide a peer-to-peer payment system, such as through traditional bank gateways, virtual currency gateways, promotional gateways, etc. The AI-STFS provides the fulfillment and settlement of an AI model between a buyer/subscriber/licensee and a seller/provider/licensor.

Figure 4:
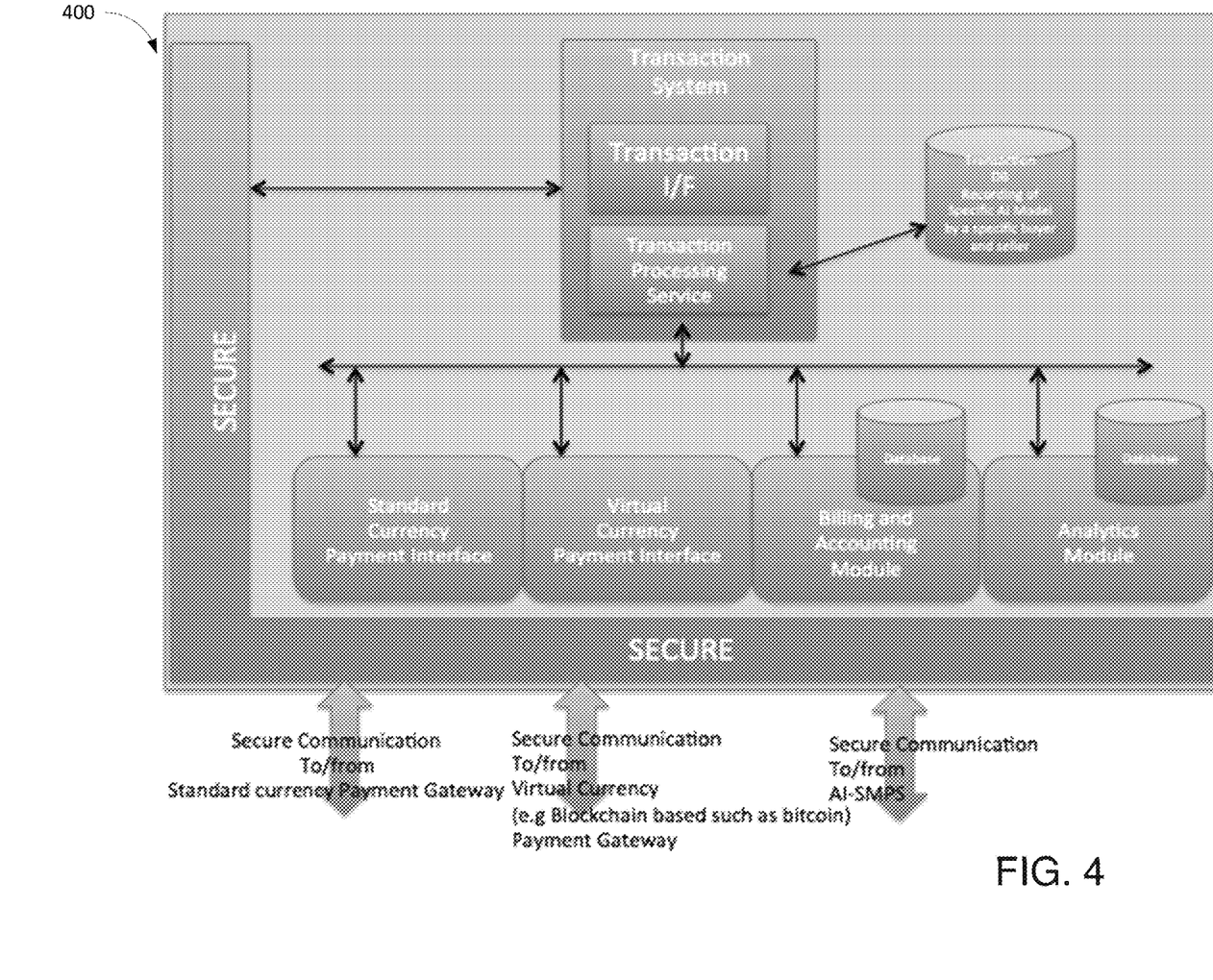
FIG. 4 shows an example block diagram of an AI secure transaction fulfillment system (AI-STFS) in greater functional detail.

FIG. 4 shows an example block diagram 400 of the AI-STFS in greater functional detail. Shown is a secure interface that connects to and provides security for a transaction system. A transaction database may supply recording of which AI models may be purchased or sold by buyers and sellers, respectively. The transaction interface may be communicatively coupled to several types of modules, such as a conventional current payment interface, a virtual currency payment interface, a billing and accounting module, and an analytics module. These modules may be used to help facilitate administrative functions of purchase/rental transactions of an AI model. The analytics module may be used to record various analytical data about the use of the AI model, as well as help provide feedback for improving the AI model for future iterations.

AI Model Secure Marketplace System (AI-SMPS)

Figure 5:
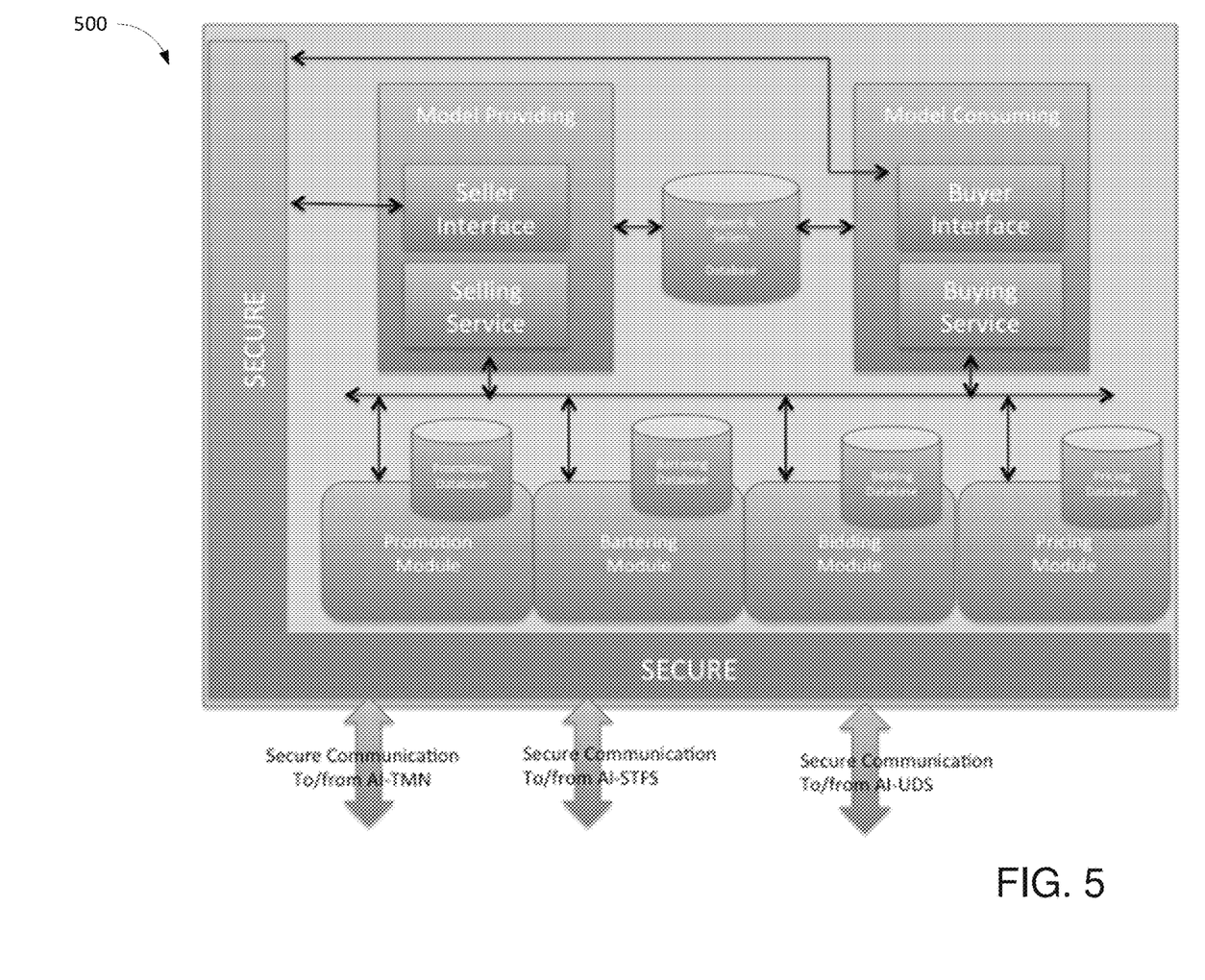
FIG. 5 shows an example block diagram of an AI secure marketplace system (AI-SMPS) that may be used to enable bidding of AI models in real time for promoting, buying, selling, licensing and bartering.

FIG. 5 shows an example block diagram 500 of the AI-SMPS that may be used to enable bidding of AI models in real time for promoting, buying, selling, licensing and bartering. As shown, the AI-SMPS may include: a selling service, a buying service, and a selling service interface. The selling service interface may export various user interface gadgets corresponding to each module that is used by the selling service to the target user agent device and/or associated user interface device. The AI-SMPS may also include a buying service interface. This interface may be configured to export various user interface gadgets corresponding to each module that is used by the buying service to the target the user agent device and/or associated user interface device. The AI-SMPS may also include a bidding module, a pricing module, a promotion module, and a bartering module. The bidding module may help facilitate the processes under which a bidding process may be undertaken to auction off an AI model to the highest bidder. The bartering module may help facilitate discussions between two or more users for how to agree to use an AI model with some kind of non-standard compensation in a bartering process. The bartering module may record all of the communications and provide various menus and calculations to help present different options for bartering. The promotion module may act as an AI program for advertising different AI models within the AI marketplace. Users may see descriptions of various AI models through the promotion module that suit stated needs or search queries. The pricing module may be used to help facilitate and record pricing options for an AI model. This may include providing dynamic pricing that may be dependent on number of users, time of day, or other ways to measure supply and demand.

In some embodiments, the selling and buying service units interact with the rest of the components to accomplish selling and buying of a personalized/customized AI model.

In addition, the selling and buying service units of the AI-SMPS may interact with the AI-TMN, AI-STFS and AI-UDS modules to accomplish certain specific platform service needs to complete the personalized/customized AI model transaction.

AI Model License & Subscription Management Platform (AI-LSMP)

Figure 6:
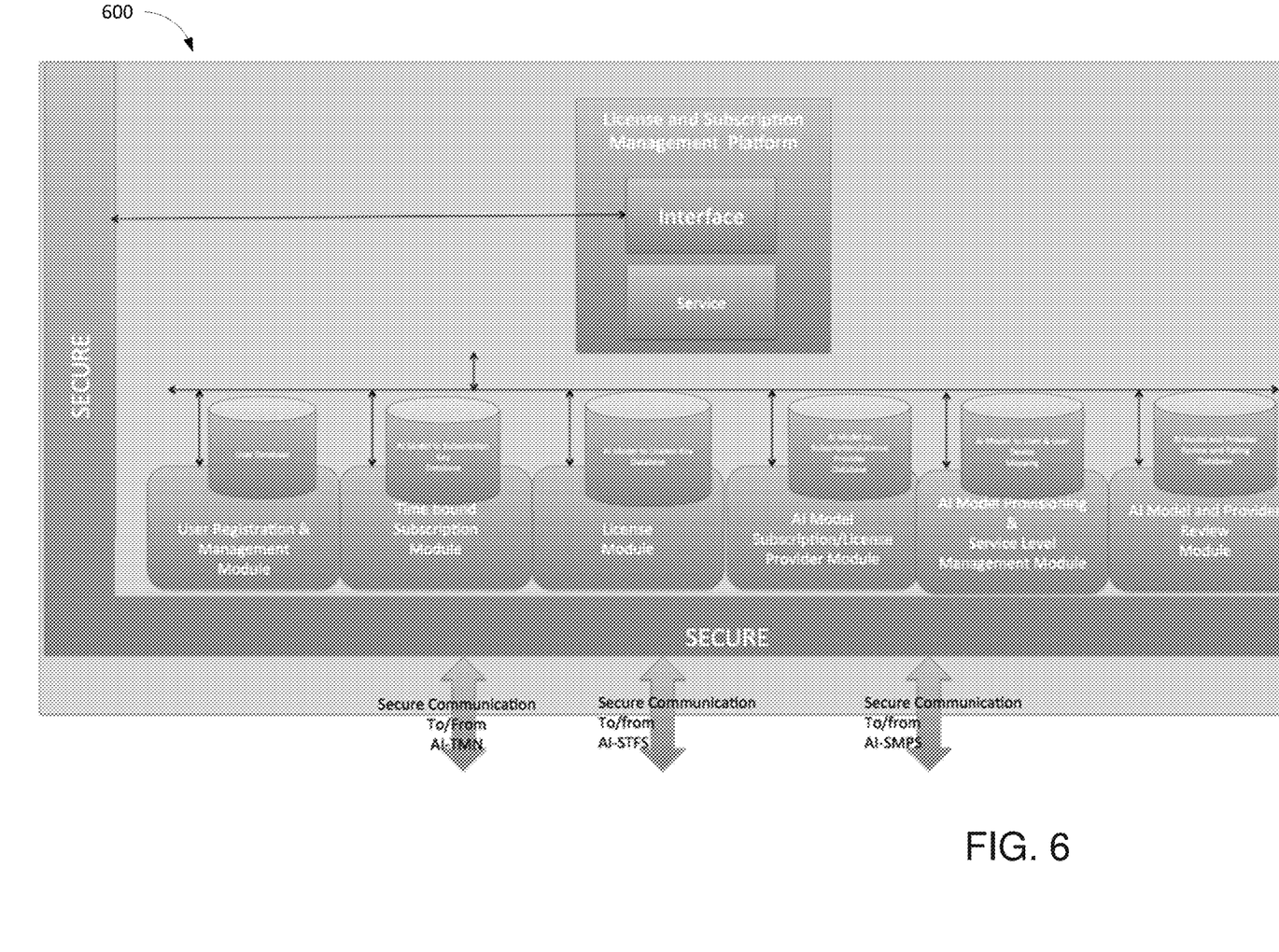
FIG. 6 shows an example block diagram of an AI license and subscription management platform (AI-LSMP).

FIG. 6 shows an example block diagram 600 of the AI-LSMP. This may be configured to interact with other platform module to allow various functions, including: a) user registration and management, and b) subscription management. The user registration and management may provide an ability to register and manage the registrations and interactions of the AI model provider/licensor and the subscriber/licensee.

The subscription management portion may provide a "pay as you use" subscription of AI models with various subscription granularities, ranging from, for example, a fully licensed key/token to a time bound subscription key/token created as per user requirements, usage and payment/promotion options.

A license key or subscription key can be uniquely tied to a single user or group of users, or to a single user agent device or group of the user agent devices.

The AI-TMN may provide an associated time bound subscription key or license key for a given AI model to be coded with "use only" rights of the AI model (for example inference only), "modify only" rights of the AI model (for example training only), or "use and modify" rights of the AI model (for example both inference and training). Each of these rights can be further qualified as being transferrable or non-transferrable, as well as with "push" or "no-push" rights.

The AI-LSMP may be configured to provide additional functions, including c) mapping of an AI model to the corresponding user who is the provider/owner of the AI model; and d) allowing subscription/license driven AI model management. This may involve uploading the selling or downloading the purchased model from/to the AI-TMN.

In addition, the AI-LSMP may also provide e) AI model provisioning and service level management. This may involve providing mapping of an AI model to a corresponding AI model subscriber/licensee and their device. The service level management may also maintain various service level agreements (SLAs) associated with an AI model subscription/licensing. It may also provide mapping from an AI model subscriber/licensee to an AI model provider.

In addition, the AI-LSMP may also provide: f) interface exports to various user interface gadgets corresponding to each module to the target user agent device and/or associated user interface device; g) reviewing of AI model and provider of the AI module with ratings and comparisons. The review module may include AI to review traded AI models. This ensures the trust and reliability of the platform by removing bad/malicious models. If this software app is used at the user end, the app can provide a direct feedback from the user, using re-informant learning, and may include asking the user who bought the model and if everything is going well, for example.

In some embodiments, all the AI models are stored only in the AI-TMN in a trusted and secured manner and not stored anywhere else. The AI models are pushed and pulled to/from the AI-TMN. Each model may be encrypted and integrity protected and used by the subscribing/licensing user with a uniquely generated time-bound/fully licensed key.

AI Collaborative Training Platform (AI-CTP)

In collaboration with other platform elements, the AI-CTP enables collaborative training of a given AI model that can be pulled from the AI-TMN by a group of users, having update rights and push rights into their respective device agents, to train the AI model in a distributed and collaborative way. The AI-CTP is configured to merge the training results from the each of the user devices before pushing back the AI model to the AI-TMN. Appropriate update, merge, push keys are generated in collaboration with the AI-TMN in order to facilitate this collaborative training, merging and pushing.

In addition, according to some embodiments, the AI-CTP also provides the following: A) provides multiple users to train on the same model at the same time to accelerate the training process with diverse data points; B) provides a way to intuitively combine the trained model across different users into one single usable model; and C) provides automated test case execution and definition.

AI User Device Server (AI-UDS)

Figure 7:
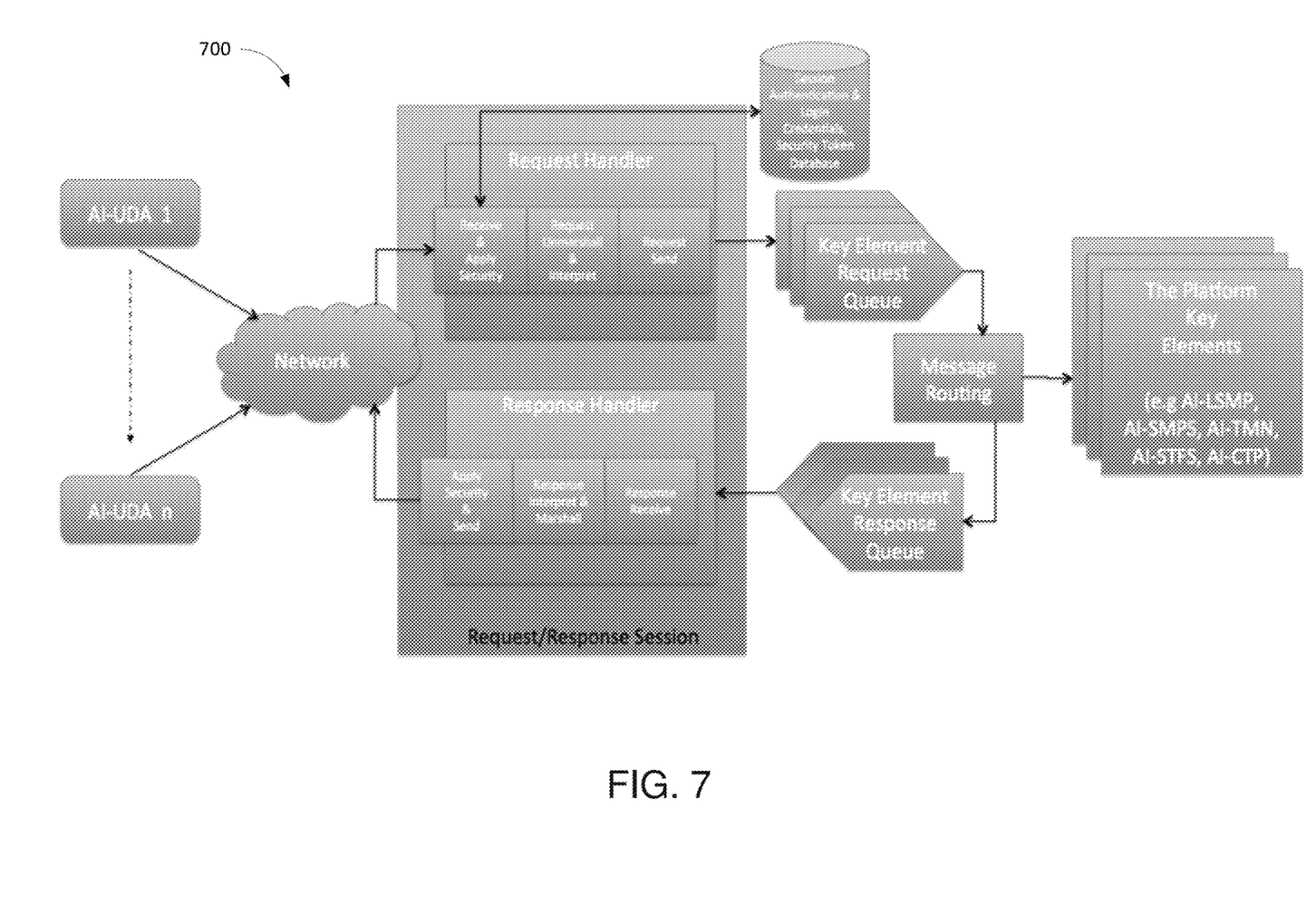
FIG. 7 shows an example diagram of an AI user device server (AI-UDS) with interactions with multiple user device agents (UDAs).

The AI-UDS may be configured to provide a primary secure interface to all users and their corresponding devices agents interacting with the AI platform. For example, the AI-UDS may be configured to provide a key entry point to all the key elements within the platform. It may also manage secure request and response sessions to/from AI-UDAs. Referring to FIG. 7, an example diagram 700 of the AI-UDS with interactions with multiple UDAs is shown. The AI-UDS handles all the requests and responses interpretation, queuing and routing to/from the platform elements, e.g., the AI-LSMP, AI-SMPS, AI-TMN, etc.

These handling of the requests and responses from/to the AI-UDAs may utilize the following steps:

1. Apply appropriate security measures including initial session authentication, login and session token;
2. Receive request from the AI-UDA;
3. Un-marshall and interpret the request;
4. Queue the request to the particular element of the platform that corresponds to the request;
5. Receive response from the particular element of the platform;
6. Interpret and marshall the response requestor;
7. Apply security measures; and
8. Send response to the corresponding AI-UDA.

AI Model User Interfaces

Each of the key or particular elements of the platform exposes various respective user interfaces to a UDA as well as to the user interface rendering devices to accomplish respective tasks.

AI User Device Agent (AI-UDA)

The following are the some notable elements of an AI user device agent:

1) Resides in the user device side and interacts with the AI-UDS of the platform for:
   a. Registration;
   b. Subscription;
   c. Request to push/pull an AI model to the AI-TMN platform;
   d. Uploading the sold or downloading the bought customized/personalized AI models;
   e. Fetching customized/personalized AI model:
     i. Time bound subscription key corresponding to the model from AI-TMN if subscribed
     ii. Permanent license key to the model from AI-TMN if buyer purchased fully for:
       i. Use;
       ii. modify;
       iii. both.
   f. Provide trusted AI model execution using one of the following keys:
     i. Time bound subscription keys;
     ii. Subscription to use, modify or both use and modify;
     iii. Permanent license key; and
     iv. License to use or modify in case user is authorized for modification of the AI model.
   g. Provide the UDA full security and a trust mechanism using:
     i. Just in time signature and integrity check of the AI model to ensure correct AI model and right User as well as device;
     ii. Just in time decrypting of the AI model before execution in a secure manner for authorized user and device only; and
     iii. Ensure that content of the model cannot be intercepted, tampered, transferred to another device or pushed to the AI-TN by the user from a given device.

Each AI-UDA will ensure AI models are executed in a protected manner for use only, modify only, and use and modify, if the user is subscribed or licensed with appropriate rights in a transferrable or non-transferrable basis.

Users who are allowed to modify rights (for example training), can do so in following manner:

i. Subscribe user or licensed user with modify (for example training) rights, where the user can modify but cannot copy the AI model from the assigned device to another device if modify rights is further qualified with non-transferrable rights;
   ii. Subscribe user or licensed user with modify (for example training) rights, where the user can modify and can copy the AI model from the assigned device to another device only if the modify rights is further qualified with transferrable rights and is authorized to do so;
   iii. Fully licensed user with modify rights can modify and can push the modified AI model from the AI-TMN from a give device if the modify right is further qualified with push rights.

The embodiments described herein eliminate multi processors/CPU, VMs, OS & GPU based full stack software AI frameworks intervention such that inference and training is self contained and real-time without any interruption or overhead associated with traditional AI accelerators working in conjunction with full stack software AI frameworks.

While several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skilled in the art in light of this disclosure. In addition, those skilled in the art will appreciate that the mechanisms of the subject matter described herein are capable of being distributed as one or more program products in a variety of forms and that an illustrative form of the subject matter described herein applies regardless of the particular type of signal-bearing medium used to actually carry out the distribution.

Instructions used to program logic to perform various disclosed aspects can be stored within a memory in the system, such as DRAM, cache, flash memory, or other storage. Furthermore, the instructions can be distributed via a network or by way of other computer-readable media. Thus a machine-readable medium may include any mechanism for storing or transmitting information in a form readable by a machine (e.g., a computer), but is not limited to, floppy diskettes, optical disks, CD-ROMs, magneto-optical disks, ROM, RAM, EPROM, EEPROM, magnetic or optical cards, flash memory, or tangible, machine-readable storage used in the transmission of information over the Internet via electrical, optical, acoustical, or other forms of propagated signals (e.g., carrier waves, infrared signals, digital signals). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor comprising one or more individual instruction processing cores, processing unit, processor, microcontroller, microcontroller unit, controller, DSP, PLD, programmable logic array (PLA), or FPGA), state machine circuitry, firmware that stores instructions executed by programmable circuitry, and any combination thereof. The control circuit may, collectively or individually, be embodied as circuitry that forms part of a larger system, for example, an integrated circuit, an application-specific integrated circuit (ASIC), a system on-chip (SoC), desktop computers, laptop computers, tablet computers, servers, smart phones, etc. Accordingly, as used herein, "control circuit" includes, but is not limited to, electrical circuitry having at least one discrete electrical circuit, electrical circuitry having at least one integrated circuit, electrical circuitry having at least one application-specific integrated circuit, electrical circuitry forming a general-purpose computing device configured by a computer program (e.g., a general-purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware, and/or circuitry configured to perform any of the aforementioned operations. Software may be embodied as a software package, code, instructions, instruction sets, and/or data recorded on non-transitory computer-readable storage medium. Firmware may be embodied as code, instructions, instruction sets, and/or data that are hard-coded (e.g., non-volatile) in memory devices.

As used in any aspect herein, the terms "component," "system," "module," and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet-switched network. The communication devices may be capable of communicating with each other using a selected packet-switched network communications protocol. One example communications protocol may include an Ethernet communications protocol which may be capable permitting communication using a Transmission Control Protocol/IP. The Ethernet protocol may comply or be compatible with the Ethernet standard published by the Institute of Electrical and Electronics Engineers (IEEE) titled "IEEE 802.3 Standard," published in December 2008 and/or later versions of this standard.

Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum, titled "ATM-MPLS network Interworking 2.0," published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components, inactive-state components, and/or standby-state components, unless context requires otherwise.

The terms "proximal" and "distal" are used herein with reference to a clinician manipulating the handle portion of the surgical instrument. The term "proximal" refers to the portion closest to the clinician, and the term "distal" refers to the portion located away from the clinician. It will be further appreciated that, for convenience and clarity, spatial terms such as "vertical," "horizontal," "up," and "down" may be used herein with respect to the drawings. However, surgical instruments are used in many orientations and positions, and these terms are not intended to be limiting and/or absolute.

Those skilled in the art will recognize that, in general, terms used herein, and especially in the appended claims (e.g., bodies of the appended claims), are generally intended as "open" terms (e.g., the term "including" should be interpreted as "including, but not limited to"; the term "having" should be interpreted as "having at least"; the term "includes" should be interpreted as "includes, but is not limited to"). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations or two or more recitations). Furthermore, in those instances where a convention analogous to "at least one of A, B, and C, etc." is used, in general, such a construction is intended in the sense that one having skill in the art would understand the convention (e.g., "a system having at least one of A, B, and C" would include, but not be limited to, systems that have A alone, B alone, C alone, A and B together, A and C together, B and C together, and/or A, B, and C together). In those instances where a convention analogous to "at least one of A, B, or C, etc." is used, in general, such a construction is intended in the sense that one having skill in the art would understand the convention (e.g., "a system having at least one of A, B, or C" would include, but not be limited to, systems that have A alone, B alone, C alone, A and B together, A and C together, B and C together, and/or A, B, and C together). It will be further understood by those within the art that typically a disjunctive word and/or phrase presenting two or more alternative terms, whether in the description, claims, or drawings, should be understood to contemplate the possibilities of including one of the terms, either of the terms, or both terms, unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures, or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials are not inconsistent herewith. As such, and to the extent necessary, the disclosure as explicitly set forth herein supersedes any conflicting material incorporated herein by reference. Any material, or portion thereof, that is said to be incorporated by reference herein but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

EXAMPLES

Various aspects of the subject matter described herein are set out in the following numbered examples:

Example 1

A marketplace service system for facilitating transference of artificial intelligence (AI) models, the system comprising: an AI user device server (AI-UDS) configured to: provide a secure interface for transmitting and receiving one or more fully trained AI models to one or more AI user device agents (AI-UDAs); and provide a secure interface for transmitting and receiving one or more partially trained AI models to the one or more AI-UDAs; an AI trusted model network (AI-TMN) configured to store the one or more partially trained or fully trained AI models, either generated originally by a user or additionally trained or modified by the one or more AI-UDAs; and an AI secure marketplace system (AI-SMPS) configured to enable the transference of the one or more AI models stored in the AI-TMN via buying, selling, renting and/or bartering.

Example 2

The system of Example 1, further comprising an AI collaborative training platform (AI-CTP) configured to enable a plurality of users to further train an AI model stored in the AI-TMN collaboratively by: transmitting the AI model to each of the plurality of users in parallel; and merging results of further training on each of the transmitted AI models from each of the plurality of users.

Example 3

The system of Example 1 or 2, further comprising an AI secure transaction fulfillment system (AI-STFS) configured to facilitate a peer-to-peer payment system for AI models stored in the AI-TMN.

Example 4

The system of any of Examples 1 to 3, further comprising an AI model license subscription management platform (AI-LSMP) configured to facilitate licenses to the plurality of users for using the one or more partially trained or fully trained AI models stored in the AI-TMN.

Example 5

The system of any of Examples 1 to 4, wherein the AI-TMN is a first AI-TMN configured to store AI models specialized in a first technical field, and the system further comprises a second AI-TMN configured to store AI models specialized in a second technical field different from the first technical field.

Example 6

The system of any of Examples 1 to 5, wherein the one or more partially trained or fully trained AI models transferred via the AI-SMPS from storage in the AI-TMN is customizable to the user who obtains the one or more AI models, such that the one or more partially trained or fully trained AI models is used for inference in a different context and with different constraints than the one or more AI models stored in the AI-TMN.

Example 7

The system of any of Examples 1 to 6, wherein bartering via the AI-SMPS comprises: agreeing to provide access of a first AI model, trained by a first user, to a second user; and agreeing to provide access of a second AI model, trained by the second user, to the first user.

Example 8

The system of any of Examples 1 to 7, wherein the AI-SMPS is further configured to enable the transference of the one of more partially trained or fully trained AI models via an auctioning service.

Example 9

The system of any of Examples 1 to 8, wherein the one or more partially trained or fully trained AI models uploaded to the AI-TMN is previously trained by the user that originally generated it.

Example 10

The system of any of Examples 1 to 9, wherein the one or more partially trained or fully trained AI models uploaded to the AI-TMN is partially-trained or untrained by the user that originally generated it.

Example 11

The system of any of Examples 1 to 10, further comprising the one or more AI-UDAs, configured to obtain the one or more partially trained or fully trained AI models from the AI-TMN and ensure that said one or more AI models are executed in a protected manner specified by the AI-TMN in one of the following forms: for use only, modify only, and for use and modify.

Example 12

The system of any of Examples 1 to 11, wherein the one or more partially trained and the one or more fully trained AI models transmitted to the one or more AI-UDAs are further configured to be additionally trained or modified by the AI-UDA.

Example 13

An AI-User Device Agent (AI-UDA) apparatus comprising: an AI engine configured to additionally train or modify a received AI model, wherein the AI model is generated originally by another entity; and an interface configured to: receive from an AI user device server (AI-UDS) the AI model; transmit to the AI-UDS the AI model after it has been modified.

What is claimed is:

1. A marketplace service system for facilitating transference of artificial intelligence (AI) models, the system comprising:
   an AI user device server (AI-UDS) configured to:
   provide a secure interface for transmitting and receiving one or more fully trained AI models to one or more AI user device agents (AI-UDAs); and
   provide a secure interface for transmitting and receiving one or more partially trained AI models to the one or more AI-UDAs;
   an AI trusted model network (AI-TMN) configured to store the one or more partially trained or fully trained AI models, either generated originally by a user or additionally trained or modified by the one or more AI-UDAs;
   an AI secure marketplace system (AI-SMPS) configured to enable the transference of the one or more AI models stored in the AI-TMN via buying, selling, renting and/or bartering;
   an AI collaborative training platform (AI-CTP) configured to enable a plurality of users to further train an AI model stored in the AI-TMN collaboratively by:
   transmitting the AI model to each of the plurality of users in parallel; and merging results of further training on each of the transmitted AI models
   from each of the plurality of users
   wherein the one or more partially trained or fully trained AI models transferred via the AI-AMPS from storage in the AI-TMN are customizable to the user who obtains the one or more partially trained or fully trained AI models, such that the one or more partially trained to fully trained AI models are used for inference in a different context and with different constraints than the one or more partially trained or fully trained AI models storied in the AI-TMN.

2. The system of claim 1, further comprising an AI secure transaction fulfillment system (AI-STFS) configured to facilitate a peer-to-peer payment system for AI models stored in the AI-TMN.

3. The system of claim 1, further comprising an AI model license subscription management platform (AI-LSMP) configured to facilitate licenses to the plurality of users for using the one or more AI models stored in the AI-TMN.

4. The system of claim 1, wherein the AI-TMN is a first AI-TMN configured to store AI models specialized in a first technical field, and the system further comprises a second AI-TMN configured to store AI models specialized in a second technical field different from the first technical field.

5. The system of claim 1, wherein bartering via the AI-SMPS comprises:
   agreeing to provide access of a first AI model, trained by a first user, to a second user; and
   agreeing to provide access of a second AI model, trained by the second user, to the first user.

6. The system of claim 1, wherein the AI-SMPS is further configured to enable the transference of the one of more partially trained or fully trained AI models via an auctioning service.

7. The system of claim 1, wherein the one or more partially trained or fully trained AI models uploaded to the AI-TMN are previously trained by the user that originally generated said one or more partially trained or fully trained AI models transmitted to the AI-TMN.

8. The system of claim 1, wherein the one or more partially trained or fully trained AI models uploaded to the AI-TMN are partially-trained or untrained by the user that originally generated said one or more partially trained or fully trained AI models transmitted to the AI-TMN.

9. The system of claim 1, further comprising the one or more AI-UDAs, configured to obtain the one or more partially trained or fully trained AI models from the AI-TMN and ensure that said one or more partially trained or fully trained AI models are executed in a protected manner specified by the AI-TMN in one of the following forms: for use only, modify only, and for use and modify.

10. The system of claim 1, wherein the one or more partially trained and the one or more fully trained AI models transmitted to the one or more AI-UDAs are further configured to be additionally trained or modified by one or more AI-UDAs.

* * * * *

UNITED STATES PATENT AND TRADEMARK OFFICE
CERTIFICATE OF CORRECTION

| | | |
|---|---|---|
| PATENT NO. | : 11,423,454 B2 | Page 1 of 1 |
| APPLICATION NO. | : 16/789357 | |
| DATED | : August 23, 2022 | |
| INVENTOR(S) | : Sateesh Kumar Addepalli | |

It is certified that error appears in the above-identified patent and that said Letters Patent is hereby corrected as shown below:

In the Claims

Column 17, Line 42, delete "AI-AMPS" and insert --AI-SMPS--.

Signed and Sealed this
Eighteenth Day of November, 2025

John A. Squires
*Director of the United States Patent and Trademark Office*